Figure 1:
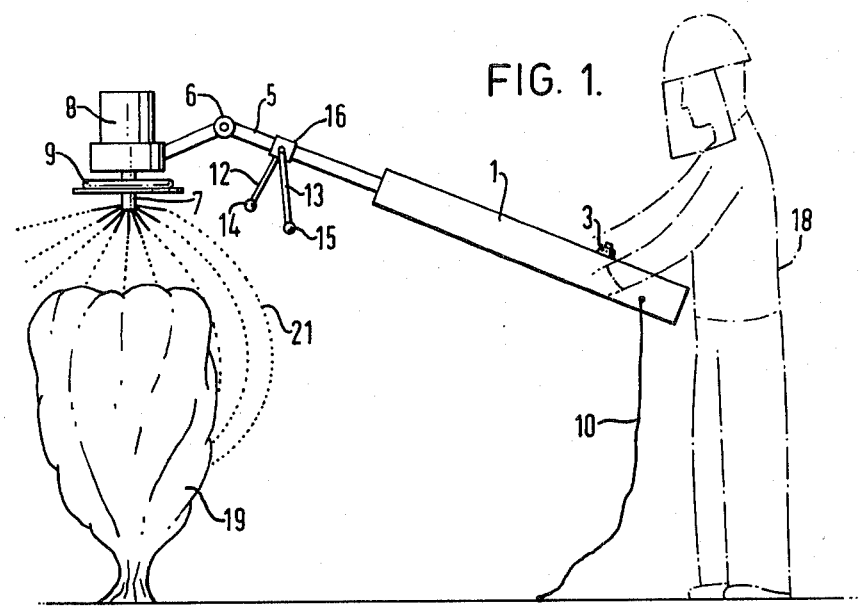

United States Patent [19]

Coffee

[11] Patent Number: 4,470,550
[45] Date of Patent: Sep. 11, 1984

[54] ELECTROSTATIC SPRAYING PROCESS AND APPARATUS

[75] Inventor: Ronald A. Coffee, Haslemere, England

[73] Assignee: Imperial Chemical Industries PLC, London, England

[21] Appl. No.: 344,719

[22] Filed: Feb. 1, 1982

[30] Foreign Application Priority Data

Feb. 9, 1981 [GB] United Kingdom ............... 8103937

[51] Int. Cl.³ .............................................. B05B 5/02
[52] U.S. Cl. .................................................. 239/697
[58] Field of Search ............................ 239/3, 690–708

[56] References Cited

U.S. PATENT DOCUMENTS

| | | | |
|---|---|---|---|
| 2,658,009 | 11/1953 | Ransburg | 239/3 X |
| 3,279,429 | 10/1966 | Felici et al. | 239/704 X |
| 3,339,840 | 9/1967 | Point | 239/3 |

FOREIGN PATENT DOCUMENTS

1569707  6/1980  United Kingdom .

Primary Examiner—Andres Kashnikow
Attorney, Agent, or Firm—Cushman, Darby & Cushman

[57] ABSTRACT

A hand-held electrostatic sprayer for use in a process for the electrostatic spraying of pesticides by producing a descending cloud of charged pesticide particles and impressing a lateral component of motion upon the cloud with the aid of a laterally disposed electrode charged in the same sense as the cloud, the sprayer including an elongated body forming the sprayer handle and having: a neck supporting a downwardly-directed electrostatic sprayhead; a reservoir for supplying liquid to the sprayhead; and a high voltage generator for charging the sprayhead to a high potential, wherein the neck carries one or more conductive elements extending downwardly from the neck beyond the sprayhead for impressing a lateral component of motion upon a cloud of charged liquid particles from the sprayhead, the elements being electrically connected to high potential of the same sign as the sprayhead.

9 Claims, 5 Drawing Figures

ELECTROSTATIC SPRAYING PROCESS AND APPARATUS

This invention relates to an electrostatic spraying process and apparatus. The apparatus may be, for example, of the type shown in UK Pat. No. 1569707.

UK Pat. No. 1569707 discloses a hand-held electrostatic spraying device, particularly useful for spraying of crops, in which both charging and atomisation of spray liquid may be carried out by electrostatic forces. The electrostatic charge placed on the spray particles in this device result in the particles being strongly attracted to earth or any other body on which an opposite electrical charge exists or can be induced. The machine projects particles towards the spray target (e.g., crops being sprayed) and most of them hit it, but there can be some which do not. UK Pat. No. 1569707 recognises that droplets which do not hit the target may be attracted back to the body of the sprayer ('back-spray') and proposes to prevent this by providing an annular electrode co-axial with the nozzle supported behind the spray nozzle and charged in the same sense as the nozzle (FIG. 11 of UK Pat. No. 1569707).

In practical operation of hand-held sprayers of the type described in the UK Pat. No. 1569707, we have discovered that spray contamination of the operator holding the sprayer is generally a more important problem than contamination of the body of the sprayer itself. While such contamination has generally been small (and less than with other known spraying devices), it is desirable to reduce it to the absolute minimum, since pesticide sprays are generally toxic, to a greater or lesser extent, to human beings. The spray nozzle, in these devices, is typically held over the crop to be sprayed (e.g., cotton) at a height of perhaps 20–40 cm above the top of the crop, using a handle about 2 meters long. In these circumstances, a charged circular electrode behind the nozzle does little to protect the operator standing at the side.

A further feature of hand-held sprayers of the type described in UK Pat. No. 1569707 is that, due to the charge on the spray produced, they have a relatively narrow swath width. If held over a row of, say, cotton, the spray falls almost all on the row beneath, and very little on adjacent rows. This can be a disadvantage, in that the operator has to carry the sprayer along each row, whereas with an uncharged spray dispensed for example from a rotary sprayer, the operator may be able to spray two or more rows at the same time.

We have now devised a spraying process, and a hand-held sprayer having a wider swath width and having little or no tendency to contaminate the operator. This sprayer may be used, for example, to spray two or more rows of crops in one pass.

According to the present invention we provide a process for the electrostatic spraying of pesticides which comprises producing a descending cloud of charged pesticide particles and impressing a lateral component of motion upon said cloud by means of a laterally disposed electrode charged in the same sense as the cloud. We further provide apparatus for carrying out the process of the invention which comprises a hand-held electrostatic sprayer comprising an elongated body forming the sprayer handle, and having a neck supporting a downwardly-directed electrostatic sprayhead, a reservoir for supplying liquid to the sprayhead and a high-voltage generator for charging the sprayhead to a high potential, wherein the neck carries one or more conductive elements extending downwardly from the neck beside the sprayhead when the sprayer is held in its normal operating position, the elements being electrically connected to high potential of the same sign as the sprayhead.

Throughout this specification the terms 'conductive' and 'conductor' include 'semi-conductive' and 'semi-conductor'. The elements may take the form of substantial straight rods. In a convenient form of the invention a pair of such rods are provided, disposed in a generally vertical plane between the sprayhead and the operator, at an angle of, e.g., 90° to one another, and at, say, 45° to the vertical. The elements are preferably externally insulated, to avoid current loss and so that the operator is not shocked if he touches them accidentally while the current is switched on. Conveniently, the elements may take the form of rods, and be mounted so as to be moveable from their operative position to a storage position in which they lie alongside the neck. The elements are preferably made as light as possible, so as to reduce the burden on the operator holding the sprayer over the crop. They may be made strong enough to act as legs when the sprayer is placed on the ground, supporting the sprayhead out of contact with the ground. This helps to prevent the sprayhead becoming contaminated. Alternatively, they may be rods of thin metal wire.

Specific embodiment of the invention will now be described with reference to the drawings in which:

FIG. 1 is a schematic side-view of an operator spraying crops with a device according to the invention.

FIG. 2 is a circuit diagram for the device of FIG. 1.

FIG. 3 is a schematic side-view of the device of FIG. 1 being used to spray two rows of crops FIG. 4 is a schematic side-view of a prior art device being used to spray one row of crops.

FIG. 5 is a schematic side-view of a second embodiment of the invention being used to spray ceilings.

The device comprises a body 1 carrying within it a high voltage generator 2 powered via a switch 3 from dry cells 4. The body has a neck 5 adjustably angled at 6 and supporting an electrically conductive annular nozzle 7. The nozzle 7 is supplied with liquid (which may be, for example, a formulation of the insecticide permethrin of the type described in European Patent Application No. 3251 of 1979) for spraying from a plastics container 8 which is removeably mounted on the nozzle 7 via a threaded collar. A metal annulus 9 is disposed around nozzle 7 behind the mouth thereof; annulus 9 is insulated from nozzle 7 and is connected to a trailing earth wire 10, while nozzle 7 is connected via conductor 17 to output terminal 11 of the high voltage generator. On the neck 5 are mounted a pair of legs 12, 13. These consist of aluminium tubes coated in polyvinyl chloride to insulate them and terminating in ball-shaped plastic feet 14, 15. Legs 12, 13 are secured to neck 5 by a spring-loaded mounting 16 which provides two stable positions. One is an operative position (as shown in FIG. 1) with legs 12, 13 projecting generally downwards, symetrically dispersed in a substantially vertical plane at right angles to the vertical plane of the axis of body 1: the angle between the legs 12, 13 is 90° and the angle between each leg and the vertical about 45°. The second is a storage position in which legs 12, 13 lie against neck 5, pointing back towards body 1. The aluminium shafts of the legs 12, 13 are connected via mounting 16 to the conductor 17 leading to output terminal 11 of the high voltage generator.

In use, as shown in FIG. 1, a sealing cap (not shown) is first removed from nozzle 7. The sprayer is then grasped by an operator 18 by the body 1 and held over the crop 19 at a height of about 40 cm from the top of the crop. Operator 18 closes switch 3, whereon high potential (e.g., 25 KV) is communicated to the legs 12, 13 and the nozzle 7. The trailing wire 10, which makes intermittent contact with the ground as the operator 18 walks along, maintains the metal annulus 9 at a low potential. Liquid emerging through the nozzle 7 is drawn out into a broad cone of ligaments 20 by the action of the strong electrostatic field between the charged nozzle 7 and the metal annulus 9 at low potential. These ligaments break up into highly charged droplets 21 of very uniform size. Those droplets projected in the general direction of operator 18 are deflected back towards crop 19 by the repulsive electrostatic field on legs 12, 13. It is thus very difficult for any pesticide spray to reach operator 18. If desired, after spraying the sealing cap may be replaced and the sprayer placed on the ground, the legs 12, 13 forming a tripod with the further end of the body 1.

Figure 2:
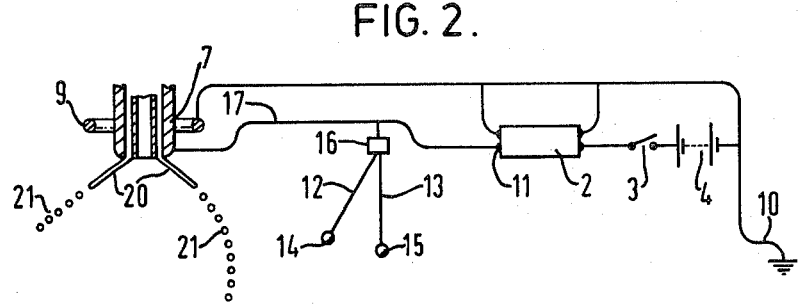
Figure 3:
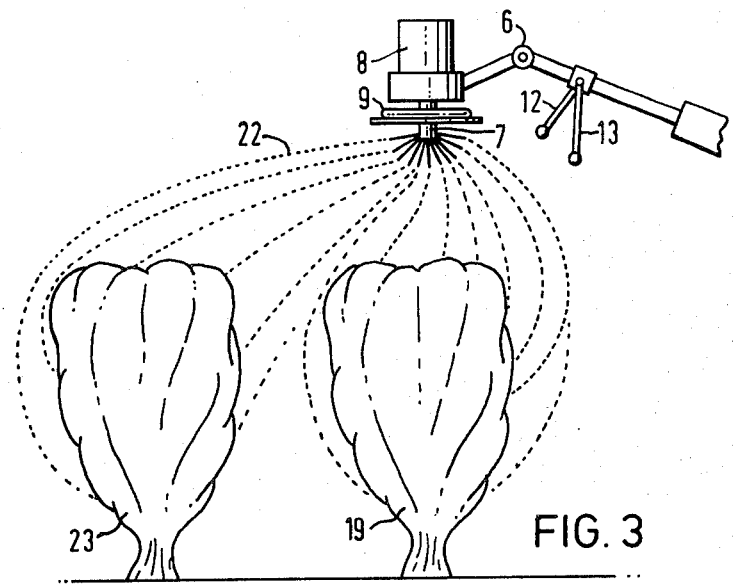
Figure 4:
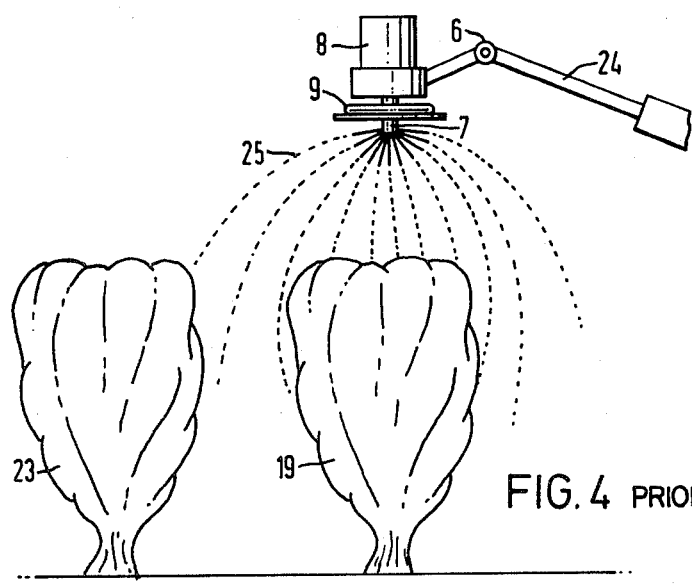

In FIG. 3 the device of FIGS. 1 and 2 is shown spraying two rows of crops. The nozzle 7 is held somewhat higher over the crop 19 than in FIG. 1 (about 60 cm instead of about 40 cm). The electric field from legs 12 13 pushes the spray cloud 22 sideways to extend and spray effectively over the second row of crops 23. Viewed from above, the shape of the spray cloud is ellipsoidal, with the major axis of the ellipse extending away from the body 1 of the sprayer through nozzle 7. FIG. 4 illustrates for purposes of comparison a sprayer 24 without any legs 13, 14 held the same distance (60 cm) above crops 19. The spray cloud 25 is roughly circular when viewed from above. Most of the spray falls on the row of crops 19. Some falls on row 23, but insufficient for effective treatment; about the same amount may be attracted to the operator.

Spraying tests with a device fitted with legs of the type shown in FIG. 1 resulted in substantially reduced operator contamination, as compared with a device without such legs of the type shown in FIG. 4.

Figure 5:
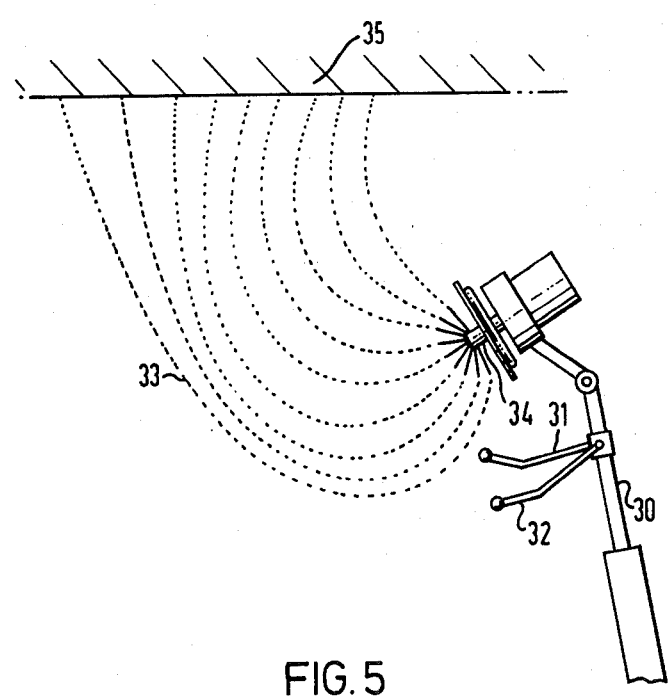

The influence of the conductive elements on the spray cloud depends on their shape, size, position and potential. For example, FIG. 5 shows a second sprayer 30 according to the invention provided with legs 31, 32 bent forwards at an angle. The construction of sprayer 30 is otherwise similar to that of the device shown in FIGS. 1-3. The spray cloud 33 issuing from the nozzle 34 receives a strong impulse sideways and some impulse upwards from the electrostatic field resulting from legs 31, 32 and if held near an overhead surface 35 (e.g. a ceiling) the device readily sprays upwards, as shown.

It is convenient to use containers with integral spray nozzles in this invention, e.g. of the types described in UK Published Application No. 2030060 A and European Published Application No. 31649. The invention is also applicable to hand-held devices using other types of electrostatic sprayhead, for example sprayheads in which the spray is mechanically atomised from a rotating disc or cup, being at the same time charged by contact or induction.

Numerous other variations are possible in the device described. The legs 12, 13 need not necessarily be at the same potential as the nozzle 7, but can be at a somewhat lower or higher potential. Adjustment of the potential in this way may give better spraying characteristics or a superior spray pattern. To modify the spray pattern further, or to give extra mechanical stability, or both, legs 12 and 13 may be joined near their feet by a stay which may itself be of conductive material. The stay may be a rod hingedly mounted on each leg, and hinged in the middle, so that the leg assembly will fold away for storage; or the stay may be hinged on one leg and removeably attachable to the other by, e.g., a stud or slot fitting. The stay may also take the form of a cord or light chain.

I claim:

1. A hand-held electrostatic sprayer for use in a process for the electrostatic spraying of pesticides by producing a descending cloud of charged pesticide particles and impressing a lateral component of motion upon the cloud by means of a laterally disposed electrode charged in the same sense as the cloud, said sprayer comprising an elongated body forming the sprayer handle and having:

a neck supporting a downwardly-directed electrostatic spray-head; a reservoir for supplying liquid to the sprayhead; and a high voltage generator for charging the sprayhead to a high potential, wherein the neck carries one or more conductive elements extending downwardly from the neck beyond the sprayhead for impressing a lateral component of motion upon a cloud of charged liquid particles from the sprayhead, the elements being electrically connected to high potential of the same sign as the sprayhead.

2. A sprayer as claimed in claim 1, wherein the element or elements are externally insulated.

3. A sprayer as claimed in either of claims 1 or 2 wherein the sprayhead comprises a charged nozzle surrounded by an annular earthed electrode.

4. A sprayer as in claim 2 wherein the conductive element or elements have the form of rods.

5. A sprayer as in claim 4 wherein such rods are rigid and can act as legs when the sprayer is placed on the ground.

6. A sprayer as claimed in claim 1 wherein the conductive element or elements have the form of rods.

7. A sprayer as claimed in claim 6, wherein such rods are rigid and can act as legs when the sprayer is placed on the ground.

8. A sprayer as claimed in claim 6 in which the rod or rods are mounted so as to be movable from their operative position to a storage position.

9. A hand-held electrostatic sprayer for spraying pesticides comprising: an elongated body having an inner end forming a handle which can be grasped at one end by an operator whereupon the body extends away from the operator; means at the outer end of said body supporting a downwardly-directed electrostatic sprayhead for generating a descending cloud of charged particles; a reservoir for supplying liquid pesticide to the sprayhead; a high voltage generator for charging the sprayhead to a high potential; and at least one elongated electrode positioned between the sprayhead and said inner end of said body, said electrode being electrically connected to high potential of the same sign as said sprayhead and being so located that when said body has been grasped by an operator said electrode projects downwardly and resides at a level below said sprayhead whereby said electrode impresses a lateral component of motion on a descending cloud of charged particles formed by said sprayhead, in a direction away from the inner end of said body and away from the operator.

* * * * *